United States Patent [19]
Uhler et al.

[11] Patent Number: 5,590,293
[45] Date of Patent: Dec. 31, 1996

[54] DYNAMIC MICROBRANCHING WITH PROGRAMMABLE HOLD ON CONDITION, TO PROGRAMMABLE DYNAMIC MICROBRANCHING DELAY MINIMIZATION

[75] Inventors: George M. Uhler; George G. Mills, both of Marlborough, Mass.

[73] Assignee: Digital Equipment Corporation, Maynard, Mass.

[21] Appl. No.: 425,683

[22] Filed: Apr. 18, 1995

Related U.S. Application Data

[63] Continuation of Ser. No. 68,835, May 28, 1993, abandoned, which is a continuation of Ser. No. 222,097, Jul. 20, 1988, abandoned.

[51] Int. Cl.$^6$ ................ G06F 9/302; G06F 9/26; G06F 9/38
[52] U.S. Cl. .................... 395/581; 364/DIG. 1; 364/DIG. 2; 395/464; 395/571; 395/387
[58] Field of Search .................... 395/375, 550, 395/800, 250, 400, 425, 775, 700, 464, 467, 452; 364/DIG. 1, DIG. 2

[56] References Cited

U.S. PATENT DOCUMENTS

| | | | |
|---|---|---|---|
| 4,236,206 | 11/1980 | Stecker et al. | 395/375 |
| 4,373,180 | 2/1983 | Linde | 364/200 |
| 4,390,946 | 6/1983 | Lane | 364/200 |
| 4,409,654 | 10/1983 | Wada et al. | 395/375 |
| 4,503,495 | 3/1985 | Boudreau | 364/200 |
| 4,514,804 | 4/1985 | Kimoto | 364/200 |
| 4,516,861 | 5/1985 | Frew et al. | 364/DIG. 1 |
| 4,546,431 | 10/1985 | Horvath | 364/200 |
| 4,586,130 | 4/1986 | Butts, Jr. et al. | 395/375 |
| 4,701,842 | 10/1987 | Olnowich | 395/375 |
| 4,709,324 | 11/1987 | Keoker | 395/375 |
| 4,750,112 | 6/1988 | Jones et al. | 364/200 |
| 4,794,521 | 12/1988 | Stewart et al. | 364/200 |
| 4,872,109 | 10/1989 | Horst et al. | 364/200 |
| 4,942,525 | 7/1990 | Shintani et al. | 364/200 |

OTHER PUBLICATIONS

Mishra, "The VAX 8800 Architecture", Digital Technical Journal, Feb. 1987, pp. 20–33.
Troiani et al, "The Vax 8600 I Box, A Pipelined Implementation of the VAX Architecture", Digital Technical Journal, Aug. 1985, pp. 24–42.

*Primary Examiner*—Daniel H. Pan
*Attorney, Agent, or Firm*—Mark J. Casey; Denis G. Maloney; Arthur W. Fisher

[57] ABSTRACT

A pipelined, microcoded CPU employs conditional branching in microcode execution Data path conditions produced by one microinstruction are used in the selection of a following microinstruction. In high-performance systems, multiple cycle microbranch latency requires that the generation of microbranch conditions be pipelined. Usually a microbranch condition is used exactly once, at the earliest possible time, when dynamic microbranch conditions are only valid a fixed number of microinstructions later in the pipeline. Flexibility of the microcode algorithm is increased by selectively inhibiting the update of the dynamic conditions to delay the use of the condition by one or more cycles, under microcode control, thereby implementing dynamic microbranches, while allowing use of previous dynamic microbranch state.

24 Claims, 12 Drawing Sheets

FIGURE 4

| | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|---|---|---|---|---|---|---|---|---|---|---|---|---|---|---|---|---|
| BASIC | 1 | ALU FUNCT | | | | MRQ FUNCT | | | | | | L | B | | | | | | V | | | CC | | MISC. | | | | | A | | | | |
| CONSTANT | 0 | 0 | ALU FUNCT | | | POS | | | | CONSTANT VALUE | | | | | | | | | V | | | CC | | MISC. | | | | | A | | | | |
| SHIFT | 0 | 0 | 1 | SHIFT VAL. | | | | | SHIFT FUNK. | | | | B | | | | | | V | | | CC | | MISC. | | | | | A | | | | |
| SPECIAL | 0 | 1 | 0 | MISC. | | | | | | | | | B | | | | | | V | | | CC | | MISC. | | | | | A | | | | |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| JUMP | 0 | MUX | | S B | | JUMP ADDRESS | | | | | | | | | | |
| BRANCH | 1 | MUX | | S B | BRANCH COND. SEL | | | | BRANCH OFFSET | | | | | | | |

DYNAMIC MICROBRANCHING WITH PROGRAMMABLE HOLD ON CONDITION, TO PROGRAMMABLE DYNAMIC MICROBRANCHING DELAY MINIMIZATION

This application is a continuation, of application Ser. No. 08/068,835, filed May 28, 1993, now abandoned which is a continuation of application Ser. No. 07/222,097, filed Jul. 20, 1988, now abandoned.

FIELD OF THE INVENTION

This invention relates to digital computers, and more particularly to instruction pipelining in a CPU of a digital processor.

RELATED APPLICATIONS

This invention is related to the following applications, which are assigned to the assignee of the present invention and concurrently filed herewith in the names of the inventors listed:

Pipeline Bubble Compression in a Computer System, William R. Wheeler and George Michael Uhler, Ser. No. 07/221,988, now U.S. Pat. No. 5,019,967.

Method for Implementing Synchronous Pipeline Exception Recovery, John F. Brown, III, Ser. No. 07/221,934, now U.S. Pat. No. 4,875,160.

Method of Resolving Deadlock Due to Data Dependent Stalls by Introduction Skew, Douglas E. Sanders, George Michael Uhler and John F. Brown III, Ser. No. 07/222,008, now U.S. Pat. No. 5,006,980.

BACKGROUND OF THE INVENTION AND RELATED ART

A general purpose computer processes data by executing one or more of several predefined instructions in a particular sequence. An example of a computing machine is a hand held calculator. In this machine, the predefined instructions (the instruction set) may include only the arithmetic operations of addition, subtraction, multiplication and division. Data and the required sequence of instructions are input by the user one by one and an arithmetic calculation results.

The set of sequential instructions that a computer executes to produce a desired result is called a program. In general purpose machines with large instruction sets, the programs may be very large. Since computers execute the instructions much faster than users can input them, it is desirable to store the programs in electronic memories so that the computer can automatically read the instructions and thereby run at top speeds.

Most modern stored-program data processing systems are based on the Von Neumann model. The Von Neumann computer design is based upon three key concepts:

Data and instructions are stored in a single read-write memory.

The contents of this memory are addressable by location, without regard to the type of data contained in that location.

Execution occurs in a sequential fashion (unless explicitly modified) from one instruction to the next.

The primary circuits of the Von Neumann computer can be broadly grouped into two parts: a memory and a Central Processing Unit (CPU). The memory holds the data and the instructions for the computer system. The CPU can be considered the brain of the system. It contains electronic logic that sequentially fetches and executes the stored instructions.

Data in most digital computers is represented in the form of binary numbers. Each location in memory is capable of storing a binary number (the maximum size of which depends upon the type of computer system). The program or set of sequential instructions that the CPU executes is stored in a particular region of memory. An instruction may occupy more than one location in memory. The first part of each instruction is called an opcode. The opcode is a unique binary number that tells the CPU which instruction it is. Most instructions have other parts that may contain operands (data to be processed) or operand specifiers. Operand specifiers inform the CPU where to find the operands that the instruction requires. These operands may be anywhere in memory or in certain temporary memory locations inside the CPU.

In general, the CPU performs the following operations to execute an instruction:

1. Fetch an instruction from memory.
2. Decode the fetched instruction to interpret the instruction.
3. Fetch from memory any operands (data on which the instruction operates) required by the instruction.
4. Perform the operation defined by the instruction.
5. Store the results of the operation in memory for future reference.

Different sets of hardware (called functional units) within the CPU carry out these operations. The functional units of a CPU may contain various registers (memory elements) and arithmetic and logic units (ALUs). The registers store temporary results and instruction operands (data on which an instruction operates). The ALU uses combinatorial logic to process the data present at its inputs. The output of the ALU depends upon the control signals provided to it, and is obtained from the input by performing an arithmetic operation or a logical (shifting or boolean) operation. The processing in the CPU is done by channeling data from operand registers through the ALU into result registers. The data may be channeled through the ALU many times for complex instructions.

Data is transferred between the basic elements of the CPU through common busses (set of wires that carry related signals). The data transfers are dependant on the type of instruction currently being executed and are initiated by a central controller. The CPU controller sends a sequence of control signals to the various registers of the CPU, telling the registers when to put data on the common read bus (going to the inputs of the ALU) and when to get data off the common write bus (coming out of the ALU). The CPU controller also tells the ALU what operation to perform on the data from the input to the output. In this way, the controller of the CPU may initiate a sequence of data transfers starting with fetching the instruction from main memory, fetching corresponding data, passing the data between the ALU and the various temporary storage registers, and finally writing processed data back to main memory.

The various implementations of a CPU controller fall under two main categories: hardwired and microprogrammed. Hardwired controllers use combinatorial logic and some state registers to produce a sequence of control signals. These control signals depend upon the type of instruction just fetched and the result of the execution of the previous instruction. The microprogrammed controller performs the same function but uses a ROM or RAM controlled state machine to produce the control signals from previous state and instruction inputs.

Hardwired controllers are tailored for a particular instruction set, and the logic used to implement them becomes increasingly complex as the complexity of the instruction set increases. Microprogrammed controllers are more general purpose devices in that changes in the contents of the control store microinstruction flow without changing the hardwired logic. While the hardwired controllers are fast, microprogrammed controllers provide more flexibility and ease of implementation.

In the simplest implementation of a microprogrammed CPU controller, each CPU instruction corresponds to a micro-flow stored in the control store. As used herein, a micro-flow refers to a micro-programmed subroutine. Each bit or decoded field of a micro-instruction corresponds to the level of a control signal. Sequencing through a series of such microinstructions thus produces a sequence of control signals. In a microprogrammed controller, each CPU instruction invokes at least one micro-flow (which may be just one micro-instruction long for small one cycle CPU instructions) to generate control signals which control ALU operations and data transfers on the CPU internal busses.

Computers are often classified into complex instruction set computers (CISCs) and reduced instruction set computers (RISCs) on the basis of the instruction sets that their CPUs support. CISCs commonly have a large instruction set with a large variety of instructions, while RISCs typically have a relatively small set of simple instructions. Since RISC CPUs have a few simple instructions, they can afford to use the fast hardwired controllers. CISC CPUs usually use microprogrammed controllers because of ease of implementation.

The simple configuration of data processing computers specified in the Von Neumann model of computation is frequently subject to enhancements in an effort to increase the computer's efficiency and usefulness. One such enhancement is the proven architectural modification of "pipelining", which can significantly increase computer performance by overlapping the execution of several instructions in the CPU, thus engaging each functional unit in productive work for a greater overall percentage of time. In a pipelined CPU, the multiple functional units concurrently perform the basic constituent segments of execution for a plurality of CPU instructions.

An example of a pipelined CPU is described by Sudhindra N. Mishra, in "The VAX 8800 Microarchitecture," Digital Technical Journal, Feb. 1987, p. 20–33.

Since each functional unit can handle only one instruction at a time, it is necessary that all functional units in a pipeline advance the instructions that they are processing in a synchronized manner. Unlike in the assembly line analogy, however, the functional units in pipelined computer may require variable amounts of time depending upon the instruction that they are currently processing. If one of the functional units takes a long time to perform its function on a particular instruction, all the functional units that follow in the pipeline must wait for it to finish before they can advance their respective instructions to the next phase of the pipeline. This delay for the purpose of maintaining synchronization is known as a pipeline "stall". Pipeline stalls can also occur if a particular instruction needs the results of a previous instruction in the pipeline which has not completed execution. The instruction that needs the results may stall the pipeline starting at the operand fetch unit, waiting for the previous instruction to pass through the pipeline and produce the operand that the stalled instruction requires.

In known RISC systems, most instructions use the various CPU functional units for equal amounts of time. Pipelining in RISCs can thus be accomplished by overlapping the execution of the simple CPU instructions, as described above. On the other hand, some CISC instructions can be quite complex, requiring numerous CPU register/ALU transfers and long periods of time to execute. Other CISC instructions may be relatively simple and require fewer transfers and much less time to execute. The disparity in functional unit usage among various CISC instructions would make a CISC instruction pipeline stall often and for relatively long periods of time. For this reason, the pipelining of CISC CPU instructions is more difficult.

CISC instructions of varying complexity may have correspondingly different sizes of microflows. Since each microinstruction provides the lowest-level control signals for one CPU cycle to all elements of the various functional units, in some CISC machines the execution of microinstructions is pipelined instead of the CPU instructions. This reduces stalling because the time of execution of each microinstruction is more nearly the same. In a microinstruction pipeline, each stage uses a few bits in the microinstruction that correspond to the functional unit of that stage. After each functional unit is done with the microinstruction that controlled its activity during a cycle, it passes this microinstruction to the next functional unit in the pipeline for the next cycle. The first functional unit gets a new microinstruction each cycle. In this way, the fundamental principle of pipelining—the overlapped instruction execution to utilize the various functional units in parallel—is realized.

A CPU instruction typically specifies an operation which requires a number of data transfers between the registers and ALU in the CPU and this sequence of transfers is carried out under control of the CPU controller. With a microprogrammed controller a single CPU instruction specifies the execution of one or more micro-flows each consisting of one or more microinstructions to be executed in order. In this way, a computer program consisting of a sequence of CPU instructions is converted by the CPU controller into a corresponding program of microinstructions that themselves must be executed in order.

In normal operation, a CPU processes instructions one at a time in the order that the instructions reside in the computer's memory. However, the CPU instruction set may include instructions that specify an alternate flow of program execution. Such instructions, called "Branch" instructions, indicate that the next instruction that the CPU should execute is an instruction other than the instruction that immediately follows the branch instruction. Branch instructions may be either "unconditional" or "conditional". An unconditional branch instruction specifies that the program execution should continue at a non-sequential location in the program memory location that is provided as part of the branch instruction. A conditional branch, however, specifies that the program execution should continue at one of a set of particular program locations. The determination of which instruction should be executed after a conditional branch instruction is made according to the current or previous state of the computer.

An example of a conditional branch instruction included in an ordinary instruction set is a "Branch on Equal to Zero" or BEQL instruction. A BEQL instruction specifies to the CPU that the program execution should divert to the non-sequential location specified within the BEQL instruction only if the result of the latest ALU operation is zero. If the latest result of an ALU operation is non-zero, program execution should continue with the instruction immediately following the BEQL instruction in program memory.

Since a microprogrammed controller translates sequences of CPU instructions into sequences of microinstructions used to control the CPU, the control store should contain microflows which accomplish conditional branching. That is, the CPU controller must have the means to cause a non-sequential CPU instruction to be fetched and executed in the case that certain conditions are met.

If the execution of microinstructions is not pipelined, microprogrammed support of conditional branching is straightforward. One microinstruction would cause the ALU to perform an operation, and a subsequent microinstruction would use the result of that ALU operation to determine which CPU instruction should then be fetched, translated into a sequence of microinstructions and executed.

If the execution of microinstructions is pipelined, however, conditional branching can cause the same sorts of data dependency problems and pipeline stalling as in any pipelined execution of instructions. Since various phases of more than one microinstruction are executing at the same time in the pipeline, a result produced from one stage of execution of a microinstruction might not be available to a subsequent microinstruction in the pipeline soon enough to be used as conditional data in a branch statement. For this reason, the micro-flows in the control store must be written in such a way as to insure that there is a delay between the microinstruction which produces a condition and the microinstruction which uses that condition to conditionally branch. This delay is termed "microbranch latency", and a number of techniques in the art exist for introducing this latency, when necessary, into instruction pipelines.

One method for introducing latency into the pipeline to delay the execution of a phase which requires data not yet available is to cause the functional units to execute "no-op" instructions. No-op instructions are processed in the pipeline in the ordinary manner, but direct the functional units in the pipeline to do nothing. By executing no-op instructions, the pipeline effectively idles, waiting for data without stalling. In high-performance systems, it is undesirable to produce a microbranch condition in one microinstruction and then insert non-productive no-op instructions to wait until the condition is available for use. One common technique for avoiding these no-op instructions is to use the intervening microinstructions during the period of microbranch latency to do useful work, or to produce other microbranch conditions to be used later.

In a microprogrammed controller system which supports pipelined conditional microbranching, it is common to use the condition exactly once and at the earliest possible time. A condition that is used only once and at a fixed time after it is produced is called a "dynamic microbranch condition" because it is not stored for later use.

There are some rare situations, however, in which a microinstruction generates a condition and requires that the use of the condition be delayed by one or more cycles. With pipelined execution of microinstructions, however, the ALU and other functional units which may generate conditions are applied to a different microinstruction in each CPU cycle, causing the dynamic microbranch conditions to be updated once per cycle. Delaying the use of a microbranch condition, therefore, imposes the requirement that the condition generated by one microinstruction not be updated by subsequent microinstructions until that condition has been used. Otherwise, a conditional branch microinstruction could base its decision upon inappropriate condition data.

Since delaying the use of condition information is rare, it is not efficient to dedicate a microinstruction bit to indicate where the condition generated by that microinstruction should be stored or latched for later use. Such a static microbranch condition implementation generally requires a wider microword than is required if dynamic microbranch conditions are used.

It is accordingly advantageous to implement dynamic microbranches while also providing the CPU with the flexibility to occasionally retain a previous dynamic microbranch condition, thus allowing a delay in the use of that condition.

SUMMARY OF THE INVENTION

In normal operation of a CPU which has a microinstruction execution pipeline, a condition code latch is used to hold the condition information generated by a microinstruction. With dynamic microbranch conditions, this latched information is used exactly once, and at a specific time after being latched. After this time, the latch is overwritten with the condition information from the next microinstruction, hence the term "dynamic" microbranch condition. According to the present invention, an encoded value in a microinstruction field allows the microprogrammer to inhibit the update of the condition code latch with the condition information generated by that microinstruction. This preserves the value of the previous microinstruction's condition information so that this information can be used at a later time.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 4 is a diagram of the format of microinstructions contained in the control store of FIG. 3;

DETAILED DESCRIPTION OF A PREFERRED EMBODIMENT

Figure 1:
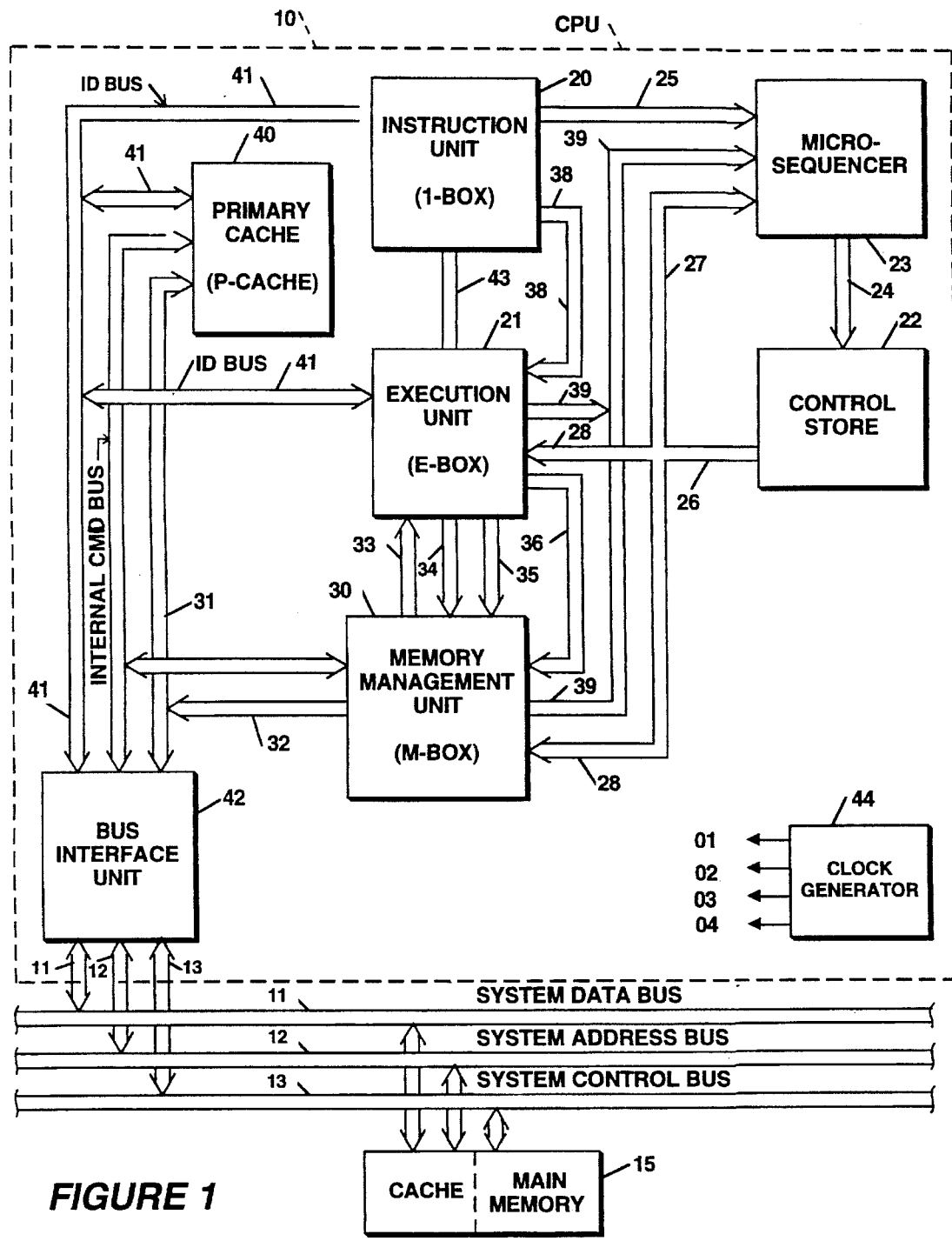
FIG. 1 is an electrical diagram in block form of a computer system including a central processing unit according to one embodiment of the invention.

The CPU:

Referring to FIG. 1, a CPU or central processing unit 10 which may use the features of the invention is illustrated. In a preferred embodiment, the CPU 10 is constructed as a single integrated circuit, but the CPU may be an integrated circuit chip set, or may be implemented with standard logic circuits or gate arrays mounted on one or more circuit boards. Although this invention is useful in any pipelined CPU, the example given here is one which executes a VAX instruction set and generally conforms to the architecture of VAX computers previously sold by the assignee. In the illustrative embodiment, the CPU 10 is connected to a system data bus 11, for example a 64-bit bidirectional bus, and to a 27-bit system address bus 12 and a system control bus 13. These busses 11, 12 and 13 are connected to system memory 15 which is not shown in detail but would usually include cache and cache controllers. The busses also access various I/O equipment.

The CPU 10, in its internal construction, includes an instruction unit 20 (referred to as the "I-Box") which functions to decode machine-level instructions for execution, along with an execution unit 21 (referred to as the "E-Box") which performs the data-manipulation part of the execution of the instruction. The CPU 10 is of the microcoded type, and employs a control store 22 which consists of a ROM (or EPROM, or the like) containing perhaps 1K or 2K words of microinstructions, with each word being fifty bits wide in this example. The control store is addressed by a microsequencer 23 which generates a series of microaddresses on an 11-bit address input 24 of the control store 22, based upon an entry point address or dispatch address received from the instruction unit 20 by an 11-bit dispatch bus 25. The output from the control store 22 is a microinstruction bus 26, 50-bits wide in this embodiment; sixteen bits of the bus 26 are connected back to an input 27 of the microsequencer 23 to provide addresses of microinstructions in a sequence following an entry point, and to provide control of the microstore addressing. The remaining thirty-four bits of the microinstruction output 26 are used as control inputs 28 to the execution unit 21 and other parts of the CPU.

The CPU 10 uses virtual addressing, and a memory management unit 30 (also referred to as the M-Box) is employed to translate a virtual address to a physical address. This unit also arbitrates instruction fetches for the instruction unit 20. The memory management unit is controlled by the 34-bit input 28 from the microinstruction bus, as well as other signals. The unit 30 is connected to a 30-bit internal address bus 31 via output 32, and is connected to the execution unit 21 by a 32-bit ALU AABus 33 for reading address registers from the memory management unit. Other connections between the memory management unit 30 and the execution unit include a 32-bit ALU output bus 34 and a 32-bit write-data bus 35; functions of these busses 33, 34 and 35 will be explained in reference to the internal construction of the execution unit 21. The unit 30 receives control bits via lines 36 from the execution unit for the purpose of defining the memory operation and word length; these control bits on lines 36 originate in the instruction unit 20 and are coupled to the execution unit 21 as part of a control bus 38. The memory management unit 30 as well as the execution unit 21 generate controls defined as microtest which are connected to an input of the microsequencer 23 via 3-bit bus 39; this is conditional data for microinstruction branching as determined by events within the execution unit 21 or memory management unit 30.

The CPU 10 includes a primary cache 40 (also called "P-Cache") which is in the example a 2K-byte high-speed RAM containing the most recently used memory data, this being either instructions or data. The cache 40 is connected to the 30-bit internal address bus 31, and to a 32-bit internal data bus 41. The internal data bus 41 also conveys instructions fetched by the memory management unit 30 for use by the instruction unit 20, and operands transferred to or from the execution unit 21.

A bus interface unit 42 controls or arbitrates the connections between the various internal busses of the CPU 10 and the system busses 11, 12 and 13, based upon an internal command bus, as well as clocks and other control bits.

Immediate (or literal) operands or addresses, contained in the instruction stream are loaded into the instruction unit 20 by bus 41. These operands are transferred to the execution unit 21 for loading to registers by a 32-bit bus 43.

A clock generator 44 produces a four-phase output (phi-1 to phi-4) which establishes a machine cycle of four phases P1, P2, P3 and P4 as will be referred to. For an example, the clock rate is 25-MHz, producing a machine cycle of 40 ns.

Figure 2:
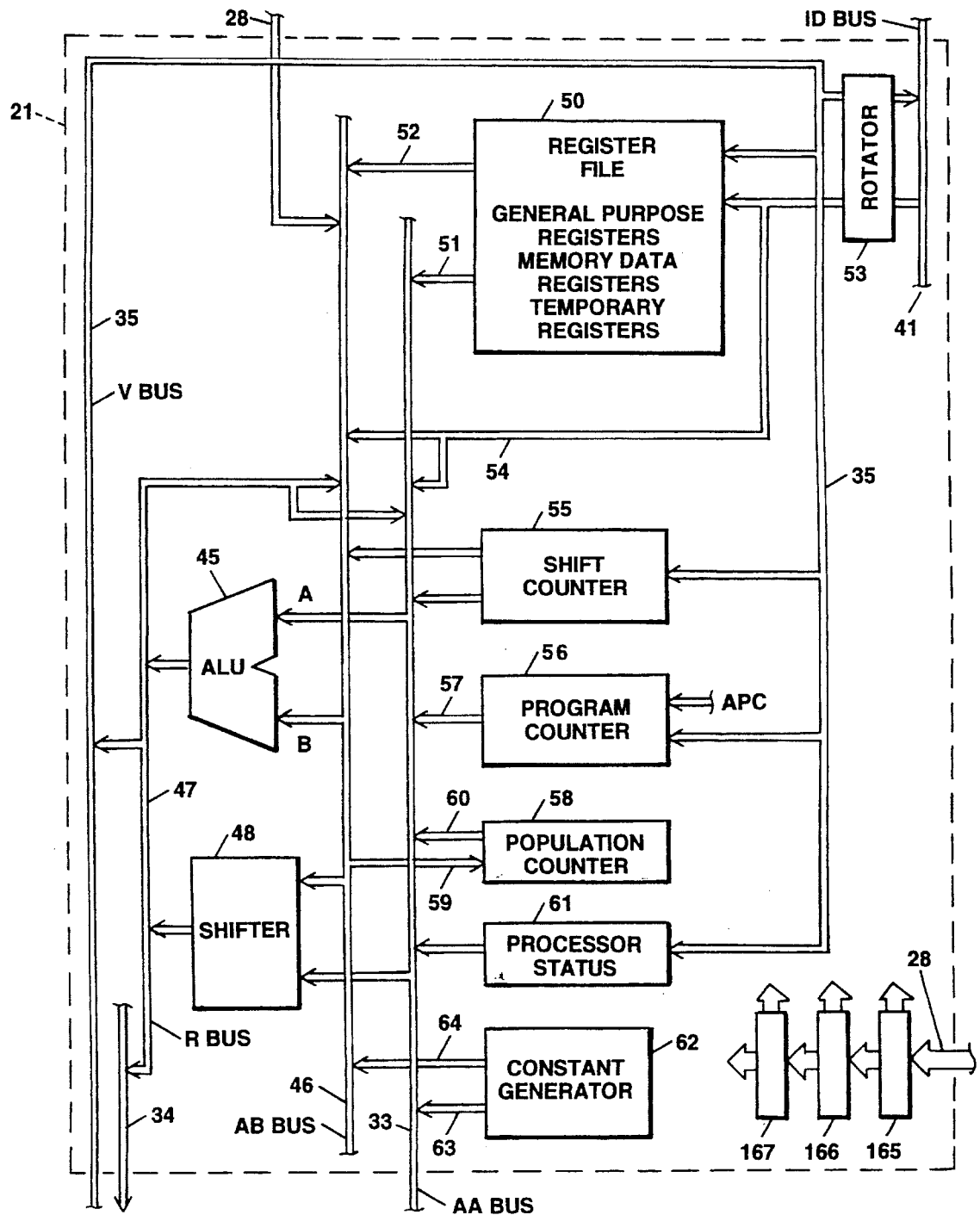
FIG. 2 is an electrical diagram in block form of the execution unit of the CPU of FIG. 1.

The Execution Unit:

Referring now to FIG. 2, the execution unit 21 is shown in more detail. This unit includes a 32-bit ALU 45 which has a 32-bit wide A-input from the AABus 33 and a 32-bit wide B-input from an ABBus 46. The ALU 45 performs the Add, Subtract, OR, etc., operations as needed to support the instruction set of the CPU, as defined by a field of the currently-used microinstruction from the bus 28. The output of the ALU is always to a result bus 47, and thus to the write bus 35. The only two sources of data to the result bus are the ALU and a barrel shifter 48, which is a 64-bit in, 32-bit out, shifter unit that implements shift operations of the instruction set. Zero to 32-bit right shifts and zero to 32-bit left shifts can be performed, under control of fields in the microinstructions sent via the bus 28. The data on the result bus 47 can be loaded to the AABus 33 or the ABBus 46 for bypass, or to the write bus 35, as well as to the ALU output bus 34 going to the memory management unit 30.

The write bus 35 can write to a register file 50, which is a set of forty-one 32-bit registers, including fifteen general purpose registers, eighteen temporary registers, and eight memory data registers; these registers contain operands and addresses currently being used, and writing to and reading from the register file is under control of fields of the current microinstruction, the only output of the register file being by 32-bit outputs 51 and 52 to the AABus 33 or ABBus 46. The internal data bus 41 can also write via rotator 53 to certain registers of the register file as determined by the microinstruction, and the internal data bus can also bypass the register file and write directly to the AABus and ABBus via input 54, as when data from the internal data bus is being written to a register file and is also being used as an ALU input in the same cycle.

A shift count register 55 provides a shift count for the shifter 48, and also functions to count cycles (as useful in multiply or divide). This counter 55 is a 32-bit register which may be loaded from the write data bus 35 or loaded to the AABus or ABBus under microinstruction control.

A 32-bit program counter or PC 56, containing an internal adder, is also part of the register set. The PC 56 contains the address of the instruction being executed. As an instruction (including opcode and operand specifier bytes, and specifier extensions) is parsed in the instruction unit 20, the PC 56 is updated to track the address by the delta-PC bits from the instruction unit on bus 38. The program counter may also be loaded from the write bus 35. The output 57 of the program counter 56 is to the AABus, from which the address passes through the ALU 45, and, ordinarily, to the memory management unit 30 via bus 34.

A counter circuit 58, referred to as the population counter, receives its input 59 from the ABBus 46 and produces an output 60 to the AABus 33; this circuit functions to count the number of bits set in a binary word loaded to the ABBus and to produce a binary value equal to this count of bits. The population counter 58 is used to count the number of bits in a save mask (a binary word, each set bit of which corresponds to a register that needs to be saved) where the binary value is used to determine the number of registers from the register file 50 or register set that must be saved in a procedure CALL, RETURN, Push-Register, or Pop-Register.

A processor status register 61 is also included in the set of registers of the execution unit 30. This status register contains the ALU condition bits, such as carry, overflow, zero and negative, as well as various other status bits such as interrupt priority level, trace pending, etc. The status register can be read onto the AABus 33, or written via the write bus 35, under microinstruction control.

A constant generator 62 produces constants for loading to the AABus or ABBus via outputs 63 and 64. The microinstruction can contain an 8-bit constant in a field of the bus 28 (a "microinstruction literal"), and this byte can be loaded to the ABBus by the constant generator 62 at any of the four byte positions of the 32-bit word width as determined by another 2-bit field of the current microinstruction. Also the generator can produce a constant of 1, 2, 4 or 8 in response to the value of the data-length DL control bits on lines 38, and this constant, representing the number of bytes in the operand to be handled, is loaded to the ABBus 46 via output 64. The constant generator is also used along with the shifter for sign-extending data.

The rotator 53 is the I/O interface between the execution unit 21 and the internal data bus 41, and functions to align the data on longword boundaries when loaded to the registers or bus of the execution unit, or to restore the data going from the execution unit 21 to memory to the intended byte positions. The two least significant bits of the address, and data length (DL control bits on bus 38), are used by the rotator 53 to make these transitions.

Figure 3:
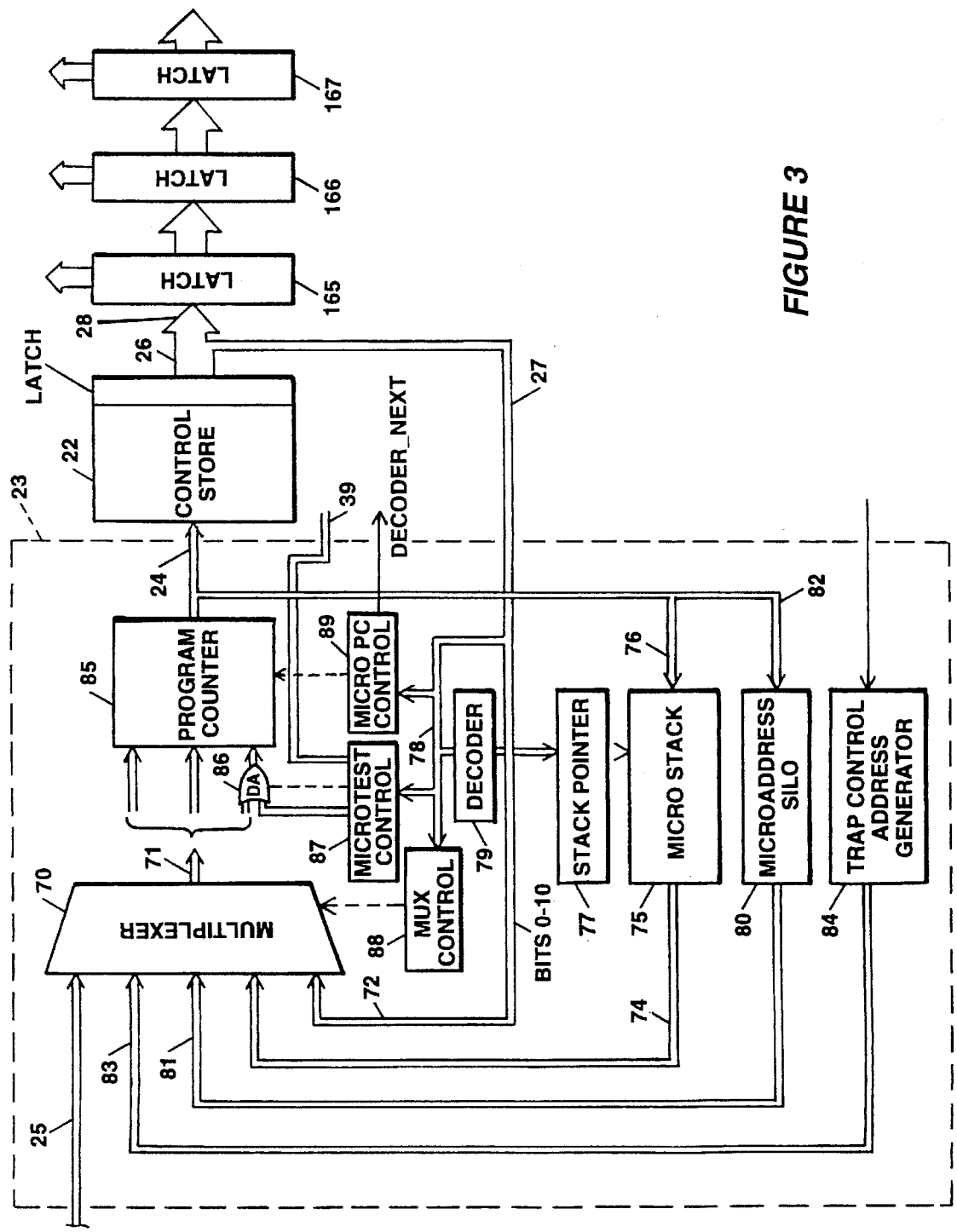
FIG. 3 is an electrical diagram in block form of the microsequencer of the CPU of FIG. 1.

The Microsequencer:

Referring now to FIG. 3, the microsequencer 23 is shown in more detail. The microsequencer produces an 11-bit address to the control store 22 in every machine cycle, and at the beginning of the next cycle the control store 22 produces a 50-bit latched output on bus 26, sixteen bits of which are fed back into the microsequencer for address and control by bus 27. These sixteen bits include an address for the next microinstruction, along with control information. FIG. 4 shows the format of the 16-bit data on the bus 27, where the two types of address and control information are seen to be a jump and a branch. The jump includes an 11-bit jump address, bits 0–10, and a 3-bit mux-control field, bits 12–14, while bit-15 is always "0" for a jump (and always "1" for a branch). Bit-11 is for microsubroutine control, for either type. The branch format includes a 7-bit offset, bits 0–6, and a 4-bit branch condition selector field.

The mux-control field is used in the microsequencer 23 of FIG. 3 to control a multiplexer 70 to produce one microaddress output 71 from a number of inputs; one input 72 to the multiplexer 70 is the jump address field, bits 0–10 from the bus 27, and of course another is the dispatch address 25 from the instruction unit 20. If the microinstruction on the output 26 is the last one of routine or microflow, a "decoder-next" output is asserted to cause the I-Box 20 to produce a new dispatch.

A third input to the multiplexer 70 is an output 74 (a stack read bus) from a register stack 75. The microaddress stack 75 is a push-down stack for storing up to eight of the 11-bit addresses appearing on the bus 24 and thus appearing on an input write bus 76 for the stack. A stack pointer 77 points to the TOS or top-of-stack, and this pointer is incremented or decremented for PUSH or POP stack operations by controls from the bits 11–15 of the control information on the bus 27, as connected via bus 78 to stack control decoder 79. If a CALL is decoded, the 11-bit address on input 76 is PUSHed to the stack 75, or if a RETURN is decoded the TOS is selected as the input to the multiplexer 70, and the stack is POPed by decrementing the pointer 77.

A microaddress silo 80 provides another input 81 to the multiplexer 70. This silo is a FIFO memory having three registers, storing the three last-used 11-bit addresses from the address bus 24, via input 82. This silo is constructed as a shift register which is clocked forward by each machine cycle, except when a stall or a trap is signalled, in which case the three addresses in the silo are saved until a trap ends, when the last three addresses may be used by jumping to a recover micro-routine, which will use the silo input 81 by the proper code to the multiplexer via bus 78.

The other input to the multiplexer 70 is an output 83 from a trap control address generator 84. A number of different types of trap microroutines, and thus addresses for starting these microroutines, are available.

A branch address, specified when bit-15 on bus 78 is a "1", is made up of three parts, assembled in the microprogram counter 85. Bits 7–10 of the 11-bit branch address are copied from the current microinstruction (i.e., the one currently already in the counter 85), and bits 0 and 4–6 are copied from the microinstruction by the input 72, while bits 1–3 are the logical OR, via gate 86, of the microinstruction on input 72 and the contents of the 3-bit microtest bus 39. That is, "Branch" type microinstructions (microbranch instructions) are detected on the microinstruction bus 28 by the microtest control logic 87. Upon detecting a microbranch instruction, the control logic 87 forwards conditions present on the microtest bus 39 to the OR gate 86, and, at the same time, MUX control logic 88 also detects a microbranch instruction on the microinstruction bus 27, and causes the microprogram counter 85 to compute a branch destination address based on the OR-ing of the conditions on the microbranch bus 39 and selected bits from the microbranch instruction provided as input to the multiplexer 70.

Also seen in FIG. 4 is the format of the microinstruction word, particularly the 34-bit part appearing on the bus 28 at the output of the control store. Four general types of microinstructions are used, these being referred to as Basic, Constant, Shift and Special. For each of these, bits 16–33 are the same and include a 6-bit "A" field (bits 16–21) which selects the source of the AABus 33 in the execution unit, and a 6-bit "W" field (bits 28–33) to select the destination, i.e., where the write bus 35 is written, such as one of the registers in the register file 50. Bit-27 is a condition code control for the processor status register 61. The miscellaneous field, bits 22–26 is decoded to define the particular operation to be performed. The Basic, Shift and Special types all have a "B" field (bits 34–37) which selects the source of data on the ABBus 46, i.e., the ALU B input. The Shift type has fields (bits 38–46) which define the shift function to be performed in the shifter 48 and the shift value (number of bits from zero to 32-bits). The Constant type of microinstruction format includes a constant value (bits 34–41) for a microinstruction literal operation, to be loaded to AABus via constant generator 62, and a position field (bits 42–43) for defining constant position. The function to be performed by the ALU 45 (e.g., Add, Subtract, AND, Pass, etc.) is defined by bits 44–48 of the Basic format or bits 44–46 of the Constant format. The bit-38 of Basic is a data word length control, and bits 39–43 define the memory request function.

Figure 5:
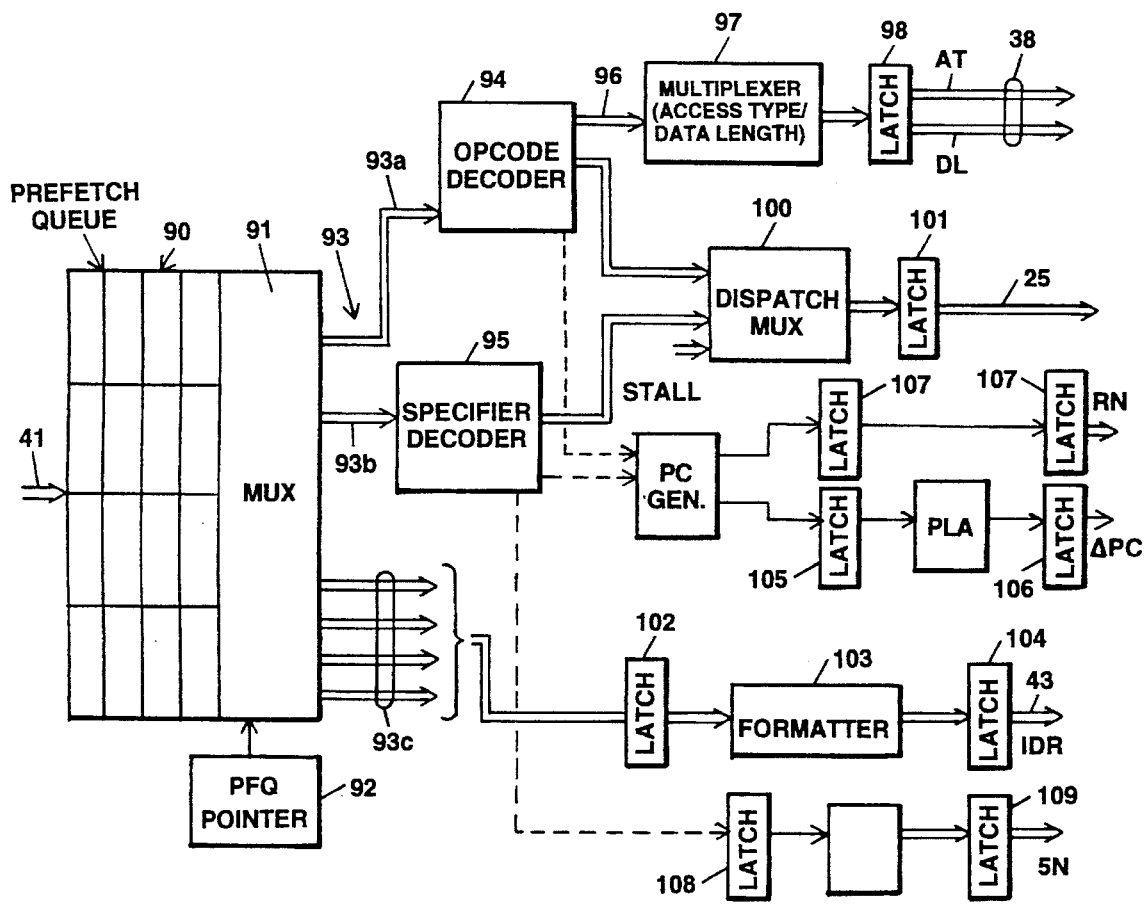
FIG. 5 is an electrical diagram in block form of the instruction unit of the CPU of FIG. 1.

The Instruction Unit:

In FIG. 5, the internal construction of the instruction unit 20 is illustrated. Instructions are loaded from internal data bus 41 into a prefetch queue 90, which is a FIFO constructed as a set of high-speed registers holding four 32-bit longwords (four four-byte instruction and operand words). Since the instructions are of variable length, having a variable number of operands and specifiers following an opcode of one or two bytes, and might not be aligned on word boundaries, the prefetch queue 90 functions to allow the information needed to begin parsing and decoding the next instruction or operand to be immediately accessible. The prefetch queue is capable of shifting up to two longwords in a machine cycle; instruction stream data is supplied to the input of the prefetch queue 90 whenever the queue is not full and no other system process requires the data path. A prefetch multiplexer 91 receives 4-bit address information from a prefetch pointer 92 to produce at an output 93 six bytes from the prefetch queue 90 which represent the next six valid bytes starting with an opcode; the opcode might not be on a longword boundary, so the output 93 includes an opcode byte 93a, a specifier byte 93b, and four bytes 93c of specifier extension field selected from queue 90 by the multiplexer 91 beginning at any of the byte positions of the queue. Two of these six bytes are connected to a set of decoders or PLA's including an opcode decoder 94 and a specifier decoder 95.

Based upon the opcode byte on output 93a, the decoder 94 produces on output 96 several sets of access type and data length control bits (referred to as AT/DL controls), one set for each operand to be used for this instruction. A multiplexer 97, receives this output 96 and selects one set for each operand as it is being defined. The output of multiplier 97 is held in a latch 98, from which the AT/DL part of the control bus 38 going to the execution unit 21 is obtained.

A dispatch multiplexer 100 selects whether the dispatch address 25 to be sent to the microsequencer 23 is an execution dispatch from the instruction decoder 94, a specifier dispatch from the specifier byte decoder 95, or a stall dispatch. A stall dispatch is produced whenever there are insufficient bytes in the prefetch queue 90 to define an execution or specifier dispatch. This stall dispatch merely forces a dispatch address to the microsequencer 23 to address a microinstruction which does nothing but issue a "decoder next" request back to the I-Box, thus a do-nothing cycle is introduced to allow the I-Box to fill the PFQ. The 11-bit address output from this multiplexer 100 is latched into a dispatch address latch 101, so it can be available for siloing. The specifier extension data, up to four bytes on the outputs 93c from the queue 90, is applied to a latch 102, from which it passes though a formatter 103 which signextends and right-justifies any specifier extension data that may exist, then to another latch 104 from which this data is connected by 32-bit bus 43 to the execution unit 21.

Also, the I-Box produces a delta-PC value in latch 105, which represents the amount the program counter 56 should be incremented in order for the E-Box PC 56 to point to the next opcode or specifier, this being based upon the number of bytes in the opcode and specifiers currently being processed. The delta-PC value in latch 105 is transformed by a PLA then loaded to a latch 106 to be available in the next machine cycle for use by the E-Box via bus 38. In addition, the I-Box produces a 4-bit RN field in latches 107, which specifies one of the sixteen general purpose registers in register file 50 that is to be used for the current specifier or execution microflow. This RN field is derived from the register field of a specifier byte. Further, a 3-bit SN field is produced in a latch 108 to specify the memory data register in the register file 50 that should be used to store the result of the current specifier flow. The value in the latch 108 is transformed in a PLA and loaded to latch 109 in the second cycle, ready for use by the E-Box in the third cycle via bus 38.

Figure 6:
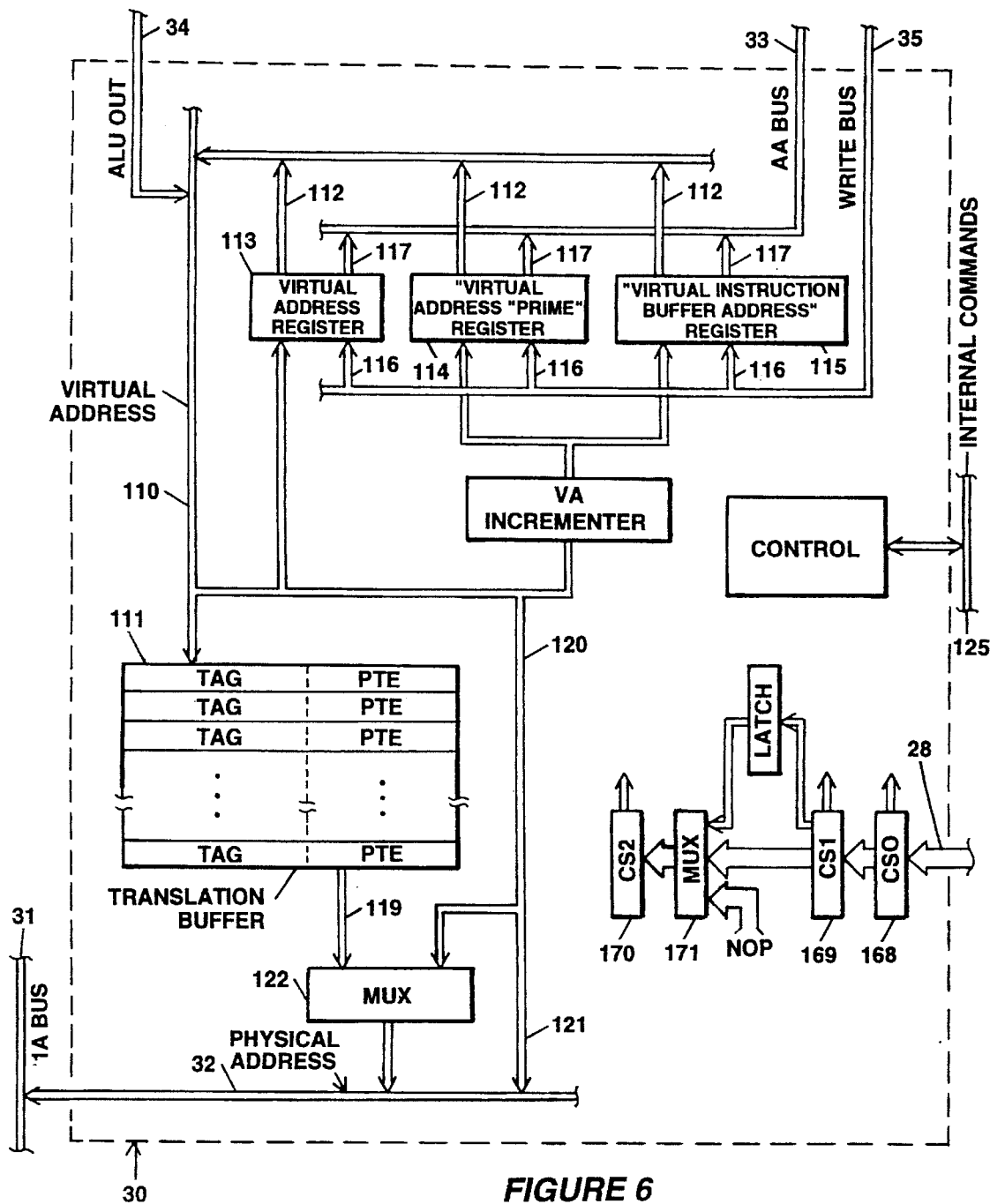
FIG. 6 is an electrical diagram of the memory management unit of the CPU of FIG. 1.

The Memory Management Unit:

The memory management unit 30 is seen in detail in FIG. 6. Any address for instruction or data read or write appears on a 32-bit virtual address bus 110, and this virtual address is used in a translation buffer 111 to generate a physical or real address which appears on the bus 32 going to the internal address bus 31. The virtual address may be generated at the output of the ALU 45 in the execution unit 21 and applied by the ALU output bus 34 to the virtual address bus 110, or it may be loaded to the bus 110 via outputs 112 from three registers, these being a virtual address register 113, a virtual address prime (VAP) register 114, and a virtual instruction buffer address (VIBA) register 115. The three registers 113, 114 and 115 allow many addresses to be generated without using the main data paths and ALU of the execution unit 21. Each of these registers can be written from the write bus 35 via inputs 116, or read via outputs 117 and the AABus 33, under control of the W and A fields of the microinstruction. The VA register 113 provides the address for write operations, and it also latches the virtual address from the bus 110 for every memory request, so if a memory management exception occurs, a microinstruction can always access the faulting address in the VA register 113. The VAP register 114 always latches the VA bus 110 plus four, so it contains the address of the next sequential longword; this register is used by microinstructions to access multiple longwords, and also to access the second longword of unaligned memory references, i.e., a memory reference that requires a second reference to complete. The VIBA register 115 is loaded whenever a microinstruction performs a flush and load of the program counter 56; the VIBA register is then used to prefetch longwords of instruction stream data from memory for filling the prefetch queue 90, being incremented by four after every instruction stream longword fetch. An incrementor functions to increment the registers 114 and 115 by four.

The translation buffer 111 is a fully associative memory containing sixty-four locations, each location containing a tag of a recent successful translation along with the page table entry (PTE) for this tag. The page address (bits 9–31) of each virtual address received from the bus 110 by the translation buffer is compared to the 23-bit tag of all sixty-four entries, and if a match occurs the PTE corresponding to the matched tag is output on bus 119 (21-bits). The lower thirty bits of the virtual address bus 110 appear on a bus 120, from which bits 0–8 are applied directly to the internal address bus 32 via lines 121 and constitute the byte address within a page; the twenty-one bits 9–29 from the VA bus 110, via bus 120, are one input to a multiplexer 122 and the 21-bit PTE from the translation buffer are the other input via bus 119, so the upper 21-bit part of the address applied to the internal address bus 31 via bus 32 is thus either directly from the VA bus or translated via the buffer 111 and the PTE. That is, by microinstruction control, the address applied to the internal address bus 31 may be directly from the VA bus 110, or it maybe a translated address using the translation buffer 111.

If the page of the address on the VA bus 110 is not among the sixty-four tags in the buffer 111, and a translated address has been specified, then a fault condition is signalled, this being a TB fault. The microsequencer 23 produces the starting address for a routine that allows the page address to be looked up in a table maintained in memory 15 or cache by the operating system; this of course will require a number of microinstruction cycles to accomplish.

A controller within the unit 30, responsive to the microinstruction currently asserted for each segment of the unit 30 in the pipeline (as explained below), produces a command on the internal command bus 125 for defining the operation of the bus interface unit 42.

Figure 7:
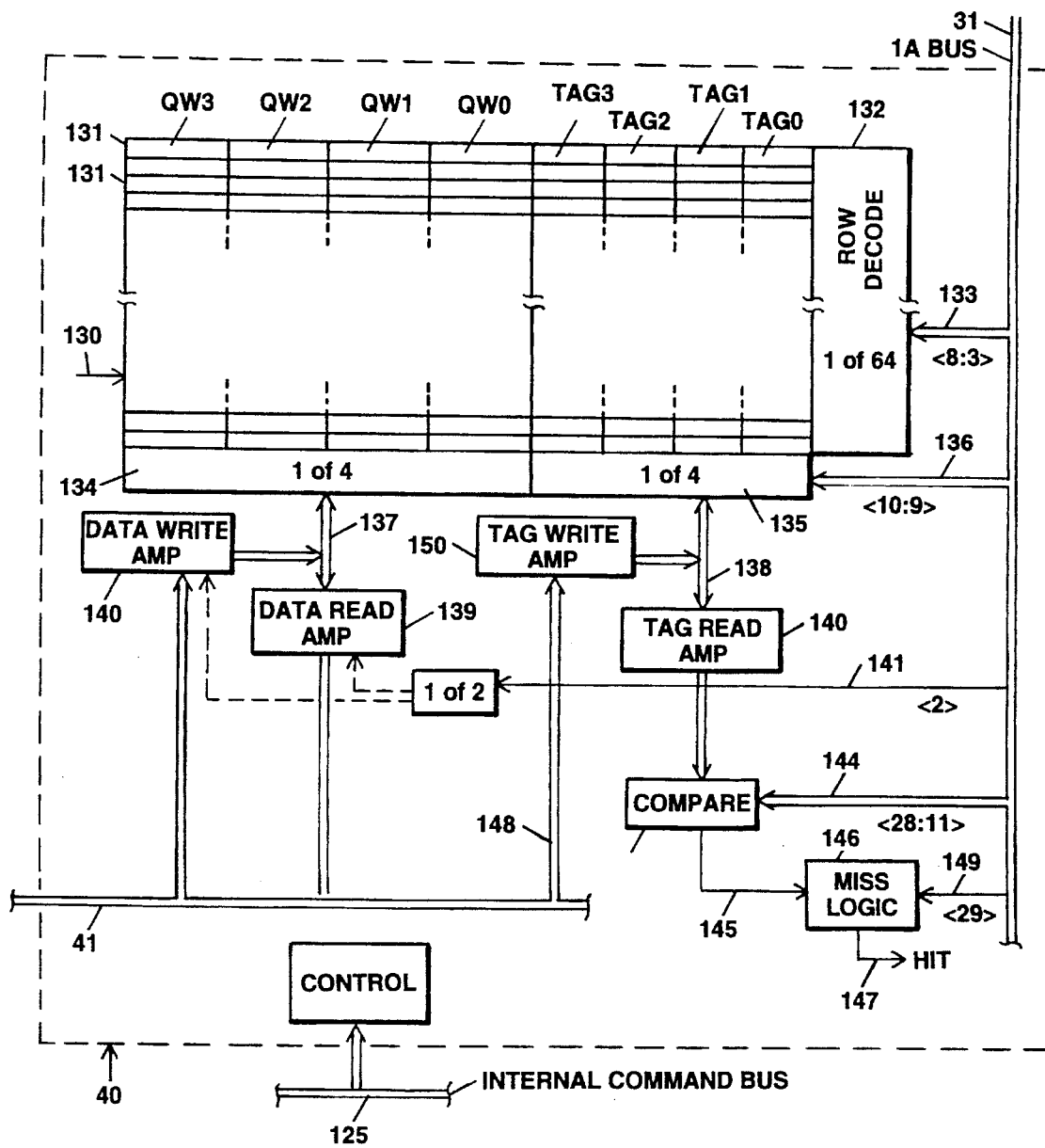
FIG. 7 is an electrical diagram in block form of the primary cache or P-cache memory of the CPU of FIG. 1.

The Primary Cache:

Referring now to FIG. 7, the primary cache or P-Cache 40 is shown in more detail. This cache contains a 2K-byte high-speed memory 130 which is addressed by the internal address bus 31 and which reads to or is written from the internal data bus 41. The memory 130 is organized as sixty-four rows with four quadwords QW0, QW1, QW2 and QW3 in each row, along with four corresponding tags Tag0, Tag1, Tag2 and Tag3, one for each quadword. A row decoder 132 selects 1-of-64 based upon six bits 3–8 on lines 133 from the internal address bus 31. The row selected will be loaded to a column decoder 134 for the data and a column decoder 135 for the tags, where a 1-of-4 selection is made based upon two bits 9–10 on lines 136 from the IA bus 31. In this manner, one tag (19-bits) and one quadword (64-bits or eight bytes) are selected at data and tag I/O busses 137 and 138 within the P-Cache. The data bus 137 is read by sense amplifiers 139, or written by write amplifiers 140, where another 1-of-2 selection is made based upon bit-2 on line 141 from the IA bus 31, so that a selected 32-bits or four bytes are loaded to or transferred from the internal data bus 41, if there is a tag hit. The tag read from the selected location in cache memory 130 is compared in a comparator 143 to the eighteen bits 11–28 from the IA bus 31 via lines 144. If all bits are the same, a hit is signalled on line 145, from which miss logic 146 produces a P-Cache hit output on line 147 if bit-29 of IA bus 31 via line 149 does not indicate that the reference is to I/O space, since I/O references are never cached. A write amplifier 150 is also provided for the tag I/O bus 138 for loading the tags when the cache 130 is filled.

Figure 8:
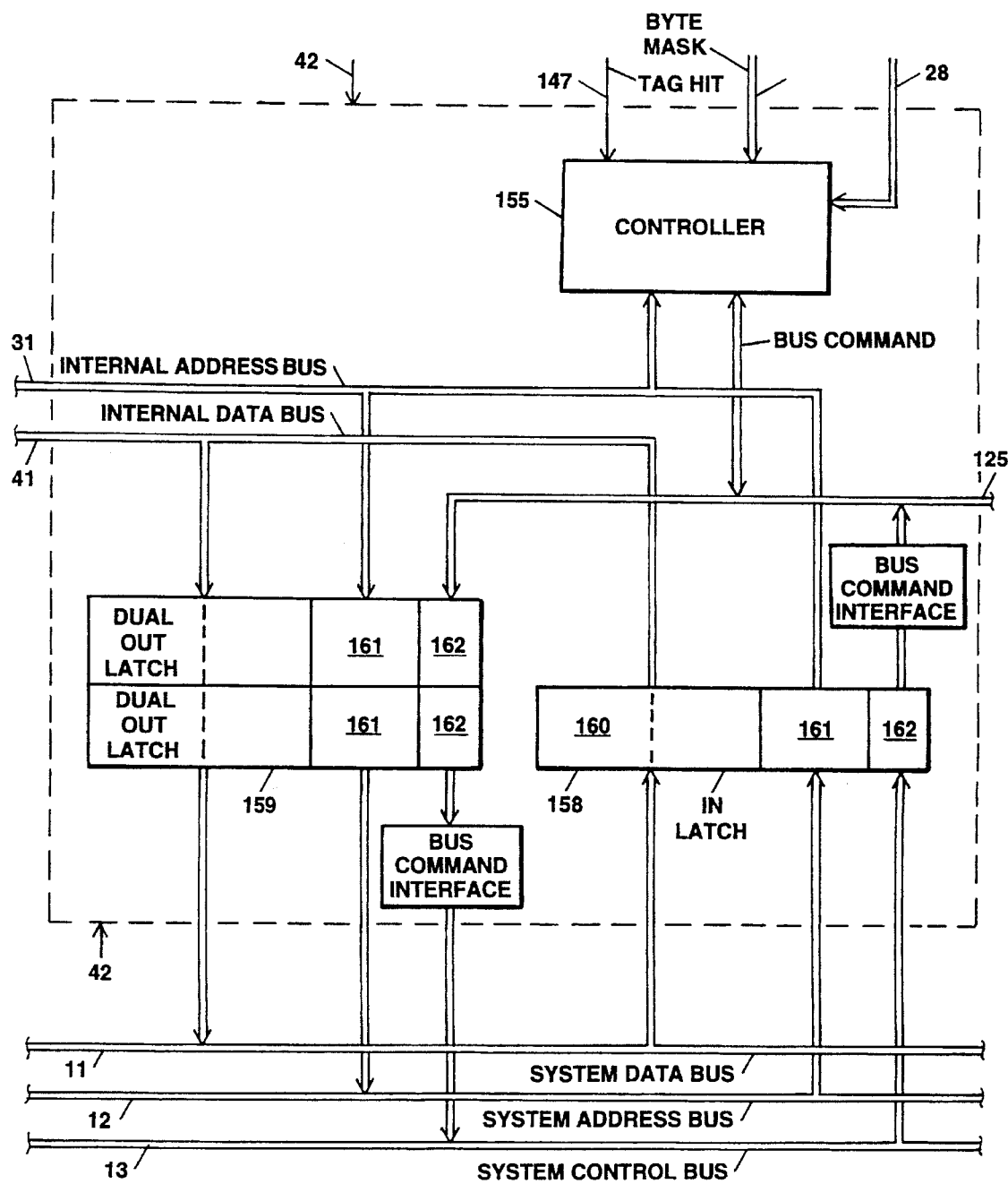
FIG. 8 is an electrical diagram in block form of the bus interface unit of the CPU of FIG. 1.

The Bus Interface Unit:

Referring to FIG. 8, the bus interface unit 42 drives the 27-bit system address bus 12 based upon the 30-bit physical address on the internal address bus 31; the difference is because the 30-bit address on the bus 31 is a byte address and the 27-bit address on the bus 12 is aligned for quadwords (eight bytes), corresponding to the quadword (64-bit) width of the system data bus 11. To allow this transition, and to allow various data lengths, aligned or non-aligned, the control bus 13 contains an 8-bit byte mask field which includes a bit for each of the eight possible byte positions, and a controller 155 in the bus interface generates an 8-bit byte mask for applying to the system control bus based upon an internal 4-bit byte mask generated in the memory management unit and connected to the bus interface by lines 156. The memory management unit uses the data length DL control bits on lines 36, originating in the decode of opcode and operand specifiers in I-Box 20 via bus 38, and of course the low-order bits 0–2 of the address on bus 31 defines the starting byte address. In this manner, transition is made between the 32-bit internal data bus 41 and 64-bit system data bus, and between the 30-bit internal address bus and the 27-bit system address bus.

The system control bus 13 also contains a 4-bit bus command, which is driven by or received by the controller 155 of the bus interface unit 42. This bus command defines what operation is occurring on the system busses, i.e., the CPU 10 reading instruction stream quadwords from memory 15, the CPU 10 reading data stream quadwords, the CPU 10 writing to memory 15, etc. This 4-bit command is asserted along with an address strobe which is another of the lines of the control bus 13, which also includes lines for Ready, Read, DMA Request, Interrupt, Halt, as well as coprocessor controls, as may be needed for implementing a complete system.

Data and addresses, and bus commands, are transferred in and out by an in-latch 158 and a dual out-latch 159, each of which contains a 64-bit data register 160, a 27-bit address register 161, and a bus command register 162. In this manner, the in-latch 158 can receive a 64-bit quadword from bus 11 in one cycle and transfer two 32-bit longwords to the internal bus 41 in two cycles. Likewise, each out-latch 159 can load two 32-bit longwords in two cycles then a 64-bit quadword can be transfered to the system bus 11 in one cycle. The reason for having two identical out-latches is to speed up CPU 10 writes to memory, since the memory write operation on the external busses 11, 12, 13 takes three cycles; with two out-latches the second can be loading while the first is being written to memory 15 via the system data bus 11.

A memory read transaction is implemented by the bus interface unit 42 when the internal command bus 125 indicates a memory read, as signalled from the memory management unit 30, occurring when the memory management unit is requesting data specified by the physical address driven onto the internal address bus 31. If this address is found in the primary cache 40 tag store, the cache 40 drives the internal data bus 41 with the data and the intended receiver (I-Box 20 or E-Box 21) latches the data from the data bus 41. If the tag misses in the tag compare 143 of the primary cache, the tag hit signal on line 147 is de-asserted, and the read command on lines 125 and the physical address on bus 31 are loaded into the out-latch 159, and the controller 155 takes over and services this read request whenever the system busses are available in the next few cycles; no further commands from the M-Box 30 will be serviced until the requested data has been received and latched into in-latch 158. The unit 42 drives the data from the in-latch onto the bus 41 and thus to the intended destination, the I-Box, the E-Box or P-Cache. As an example, if the primary cache misses, and the data must be fetched from main memory 15, the read transaction may take six machine cycles, during which the pipeline of the CPU is stalled.

A memory write sequence begins with a write command being asserted on the internal command bus 125 by the M-Box, at which time the M-Box also drives the internal byte mask onto lines 156. Because the cache 40 is of the "write-through" type, all memory writes are "tried" in the cache and executed in main memory. Thus when a write command is on the internal command bus 125, the P-Cache 40 compares the address on the bus 31 to its tag array. If the reference hits, the data then on the ID bus 41 is written into the cache RAM 130. If the tag compare misses, the data is ignored by the P-Cache. In either case, the data on the IA bus 31, the ID bus 41, the internal command bus 125 and the byte mask, are all loaded into the out-latch so that an external write sequence can write to main memory (and a back-up cache if used).

Figures 9, 11:
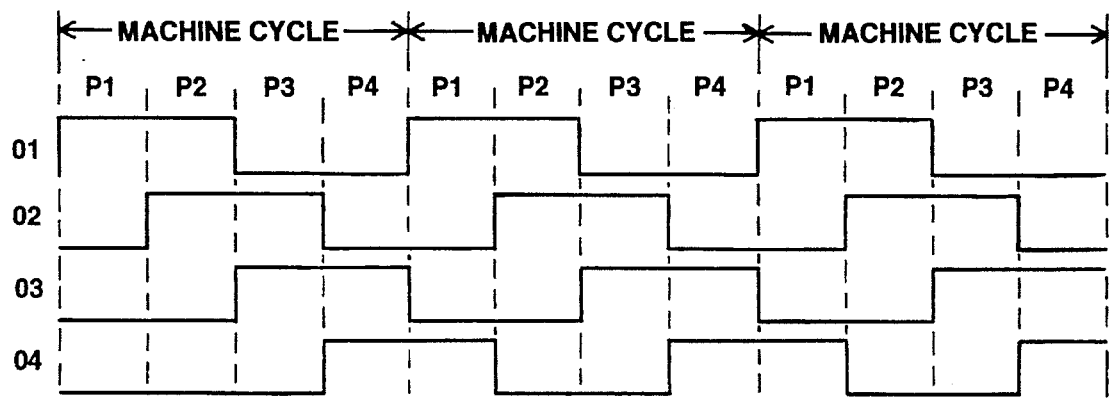
FIG. 9 is a timing diagram showing events occurring in the pipelined CPU 10 of FIG. 1 in successive machine cycles.
FIG. 11 is a timing diagram of the four phase output clocks produced by the clock generator in the CPU of FIG. 1.

Pipelining:

The CPU 10 of FIGS. 1–8 is highly pipelined; events in the execution of an instruction are spread over many machine cycles, and execution of parts of a number of instructions are overlapped, i.e., occurring at the same time. The CPU uses a five-segment pipeline, as illustrated in a general sense in FIG. 9, where an instruction I1 is seen to begin its execution in segment s1 during cycle 1, and continue through segment s5 in cycle 5. Instruction I2 begins execution in segment s1 in cycle 2, when instruction I1 is in segment s2, and likewise continues through to segment s5 in cycle 6. In cycle 5 and thereafter, there are parts of five different instructions executing in parallel in the five segments of the pipeline. Of course, FIG. 9 is an idealistic situation, where it is assumed that every instruction executes in exactly five segments, and there are no stalls or exceptions; in this ideal case the average execution rate would be one instruction per machine cycle.

Figure 10:
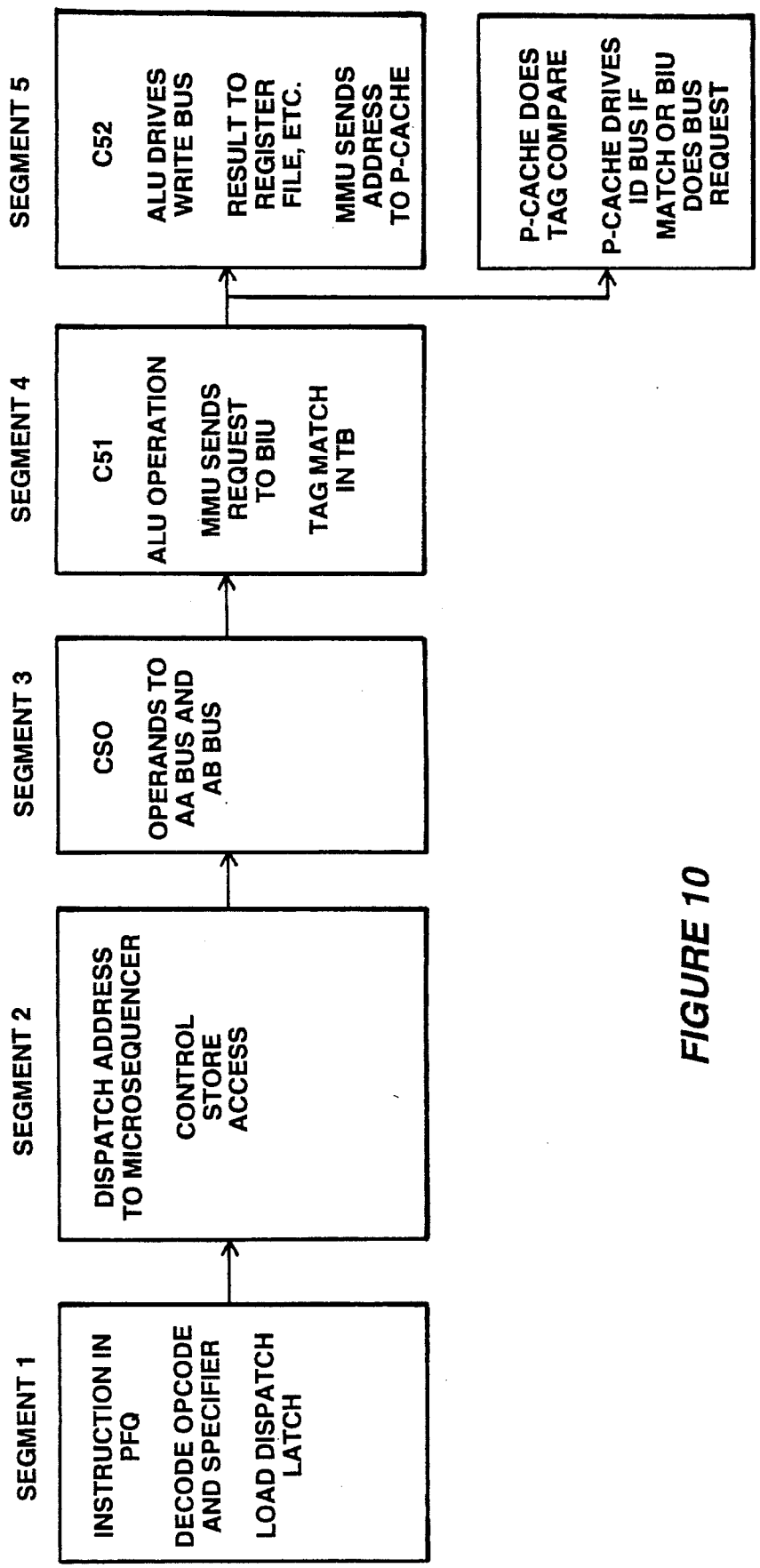
FIG. 10 is a diagram of events vs. time showing detail of one instruction execution in the CPU of FIG. 1–8.

The actual events occurring in the five segments of the pipelining in the CPU 10 of FIGS. 1–8 are more fully shown in FIG. 10. First, it will be noted with reference to FIG. 11 that the CPU 10 is clocked by the clock generator 44 to provide four phases P1, P2, P3, and P4, of equal length, in each machine cycle. These clock phases are used to drive the CMOS circuitry used to construct the CPU 10, in the example embodiment.

In segment-1 of FIG. 10, if the instruction unit 20 has a valid instruction and operand specifier present in the prefetch queue 90 during phase P1, then this information is decoded in the decoders 94 and 95 during P2 and P3, so that the output of the dispatch multiplexer 100 is available in P4 and the latch 101 is loaded with the dispatch address. Latch 102 is loaded in P4 with parsed specifier extensions, which are part of the instruction stream data.

In segment-2, the dispatch address is driven onto bus 25 during P1, and the control store 22 is accessed during P2 and P3. The microinstruction is available at the output 26 during P4 of this segment, ready for loading to the first level of controlled elements of the execution unit in P1 of the next cycle. Also in this segment-2, the specifier extensions, if any, are formatted in going from latch 102 through the formatter 103 to latch 104, and the data such as Sn and Rn is calculated and latched, and the AT/DL information is latched, so this data and control information will be available for the execution unit 21 via bus 38 at the beginning of the next cycle.

In segment-3 of the pipeline, also referred to as the CS0 segment, the execution unit 21 accesses the various registers or busses and places the data to be operated upon on the AABus 33 and ABBus 46, based upon the A and B control fields of the microinstruction available in a 34-bit CS0 latch 165, where it has been loaded via bus 28. The register file 50, the internal data bus 41, the immediate data bus 43, are all sources for the operands to be loaded to AABus and ABBus in this segment, as well as the remainder of the register set, including the program counter 56, the address registers 113, 114 and 115 in the memory management unit 30, etc.; all of these are set up to be available for read in P4 of this cycle. Also, the execution unit accepts the control bits on bus 38 during P1 of this segment.

In segment-4, also called the CS1 segment, the operation specified by the ALU Function part of the microinstruction, if it is a Basic or a Constant type as seen in FIG. 4, is performed in the ALU 45, or, if the microinstruction is a Shift, the operation specified by the Shift Function and Shift Value fields of the microinstruction is performed in the shifter 48. Since the control store 22 will be producing a new microinstruction during every cycle, it is necessary to have stored the microinstruction from the last cycle when the same microinstruction was used in segment-3; to this end, the microinstruction output 28 available from the control store is latched in the CS0 latch 165 and the output of this latch is used for the operations performed in segment-3, then is latched at the end of the cycle into another CS1 latch 166 as seen in FIG. 3 so that the microinstruction is available for the execution unit 21 in segment-4. Again, the output of this latch 166 is stored in a similar CS2 latch 167 at the end of segment-4 (fourth clock cycle for this instruction) for use in segment-5.

The operation of the memory management unit 30 occurs in parallel with the pipeline segments of the execution unit 21. The microinstruction from bus 28 is latched in segment-3 into a different CS0 latch 168 seen in FIG. 6, then into another CS1 latch 169 in segment-4, so the microinstruction Memory Request field seen in FIG. 4 will be available when needed. During P2 of the machine cycle of segment-4, the unit 30 sends a request to the bus interface unit 42 if the busses are going to be required. The unit 30 determines the address source defined by the microinstruction which is in the CS1 latch 169, among the possible sources of the ALU out bus 34, the VA register 113, etc, and the virtual address bus 110 has the selected address available during P4, and the translation buffer 111 makes the tag look-up. At the end of segment-4, the microinstruction is transferred from the CS1 latch 169 to the CS2 latch 170 through the multiplexer 171, if no delay is introduced by a fault or exception.

In segment 5, the write bus 35 is driven by the ALU 45 or shifter 48 output in the execution unit 21, and writes to the destination defined by the W field of the microinstruction in CS2 latch 167. The possible destinations include a selected register in the register file 50 or the other ones of the register set, the internal data bus 41 via the rotator 53, the AABus or ABBus for bypass, or the virtual address bus 110 in the memory management unit. During P1 of segment-5, within the memory management unit 30, the PTE is read to bus 119 and onto the internal address bus 31 via bus 32 if the translation buffer 111 has found a match. The row decoder in the primary cache 40 receives the address from IA bus 31 during P2 and accesses the data and the tag by the end of P2, then the tag comparator 143 does the tag compare in P3; if there is a match then data is available on the internal data bus 41 at the end of P3 if a read is being performed or is written to cache memory 130 in P4 if it is a write. If there is no tag match, then a miss is signalled in P3 on line 147. In the memory management unit, if the translation buffer 111 does not detect a tag match, then a exception is determined by P2 of segment-5 and signalled so that a routine to look up the page number for generating a physical address can be implemented.

The five-stage pipeline shown in FIG. 9 can be conceptually separated into three semi-autonomous sections, each operating under independent control and performing distinct constituent sub-tasks of CPU instruction execution, but also cooperating to accomplish the overall goal of CPU 10. Segment-1 and segment-2 comprise the first section of the pipeline. These segments primarily utilize the facilities of the I-Box 20 to parse and decode instruction stream data, to format this data, and to pass control and data information to the E-Box 21. The operation of the two I-Box segments is controlled by Programmed Logic Array (PLA) state machines included in the I-Box. Segment-3, segment-4 and segment-5 (CS0, CS1 and CS2 segments) of the pipeline are implemented in part in both the E-Box 21 and the M-Box 30. These three segments function collectively to perform the actual work involved in a machine-level CPU instruction. Both the E-Box 21 and M-Box 30 derive control for their operation from the sequence of microinstructions provided to them by the microsequencer 23 via the microinstruction bus 28. Finally, the bus interface unit (BIU) 42 and P-Cache 40 make up the third autonomous section of the pipeline, which operates in conjunction with the E-Box 21 and M-Box 30 during segment-5 of the pipeline. The BIU 42 operates under control of memory access address and control information provided to it by the M-Box 30, and acts as an arbiter for the use of external and some internal busses.

According to this example embodiment of the invention the pipeline segments CS0, CS1, and CS2, which operate under control of microinstructions, execute the arithmetic or logical computations actually specified in machine-level instructions as previously explained. The three segments correspond to three basic phases of execution, namely operand access, arithmetic or logical computation, and result storing.

Figure 12:
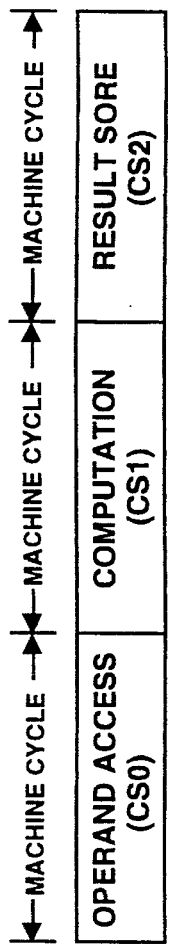
FIGS. 12, 13 and 14 are also diagrams of events vs. time showing pipelined execution of microinstructions in the CPU of FIGS. 1–8.

The microsequencer 23 implements a state machine which performs sequencing for the execution of microinstructions. The state machine is implemented as a three-phase micropipeline which provides a new microinstruction to the CS0 segment every CPU cycle. The execution of a microinstruction (i.e. the use of a microinstruction to control activity in the CPU) is spread across three machine cycles, so that a microinstruction which enters the pipeline provides control to the pipeline segments for three consecutive cycles. FIG. 12 shows the three phases of microinstruction execution. During the first cycle that a microinstruction enters the pipeline, that microinstruction controls the CS0 segment in the accessing of operands to be used by the ALU 45 on shifter 48 in the next cycle. The selection of the next microinstruction to execute is also done in this first cycle of microinstruction execution. During the second cycle that a microinstruction is in the pipeline, it controls arithmetic or logical computations in the execution unit 21. During the third cycle that a microinstruction is in the pipeline, it controls CS2 segment of the pipeline, which handles the storing of results produced in the computation (CS1) segment of execution.

Figure 13:
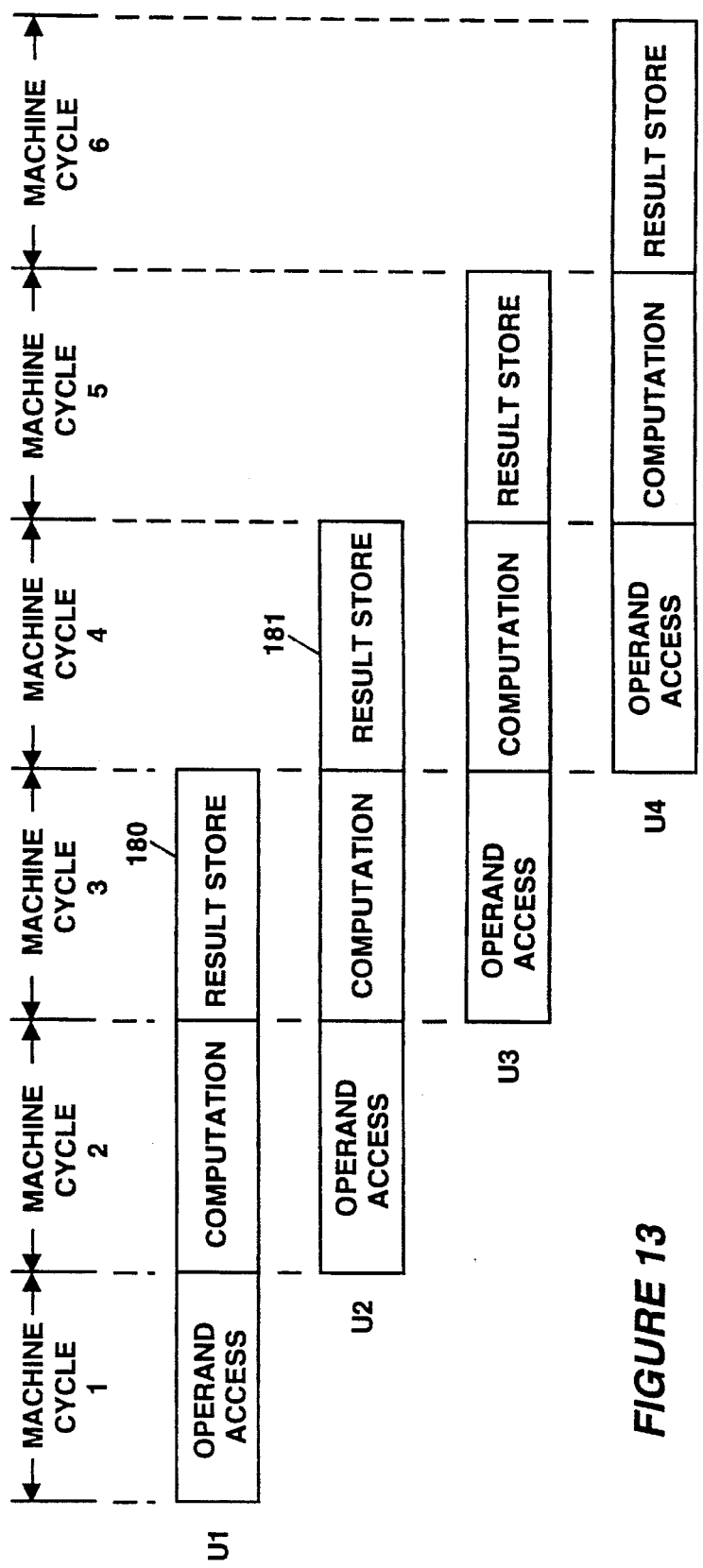

The overlap of execution of microinstructions is shown in FIG. 13. Assume that the pipeline is initially empty, and that microinstruction u1 enters the CS0 segment at the beginning of machine cycle 1. At the beginning of cycle 1, the conditions present on the microtest bus 39 (generated as a function of the outcome of a previous microinstruction computation, as described hereinafter) are used by the microtest control logic 87, multiplexer control logic 88, and microprogram counter logic (all contained in the microsequencer 23) to determine the next microinstruction (u2) to be executed.

In cycle 2, microinstruction u1 has advanced to the computation phase, CS1, and microinstruction u2 has entered the CS0 segment. In cycle 3, microinstructions u1 and u2 have advanced to the CS2 and CS1 segments, respectively, and microinstruction u3 enters the CS0 segment. A short time after the beginning of cycle 3, specifically at a point 180 in FIG. 13, the conditions resulting from the computation performed by microinstruction u1 during cycle 2 are latched then driven onto the microtest bus 39. Notice that since the determination of the next microinstruction to execute occurs at the beginning of the CS0 stage of each microinstruction execution, the conditions produced by microinstruction u1 at point 180 are not available to microinstructions u2, or u3 for their determination of next microinstructions to execute. Instead, the conditions generated by microinstruction u1 are used by microinstruction u4 at the beginning of cycle 4.

Just after microinstruction u4 uses the conditions produced from the computation controlled by microinstruction u1, at a point 181 in cycle 4, microinstruction u2 latches then drives a new set of conditions on the microtest bus 39, effectively overwriting the conditions generated by microinstruction u1. This implies that the conditions produced by microinstruction u1 at point 180 are available for use at exactly one point (at the beginning of cycle 4) and only for a short time. This is typical of dynamic microbranch conditions, which are not latched for repeated use or for use at more than one point in time. Thus, in this embodiment, there is a microbranch latency of exactly three cycles; that is, conditions like those generated at point 180 by microinstruction u1 are available for use in determining next microinstruction information at only one point, by the third microinstruction to follow the one generating those conditions. By writing microprogram routines (micro-flows) which recognize this latency period, the intervening microinstructions (microinstructions u2 and u3 in the example) can be used to perform productive work, rather than being wasted by inserting non-productive no-op instructions.

In certain circumstances, it is desirable to increase the period of microbranch latency beyond the normal three cycles. According to the present invention, therefore, a field of encoded bits in a microinstruction can be used to inhibit the updating of condition information generated that microinstruction and otherwise available to the microsequencer's next address logic. In effect, this preserves the value of the conditions produced by the previous microinstruction and allows the use of the conditions to be delayed.

Figure 14:
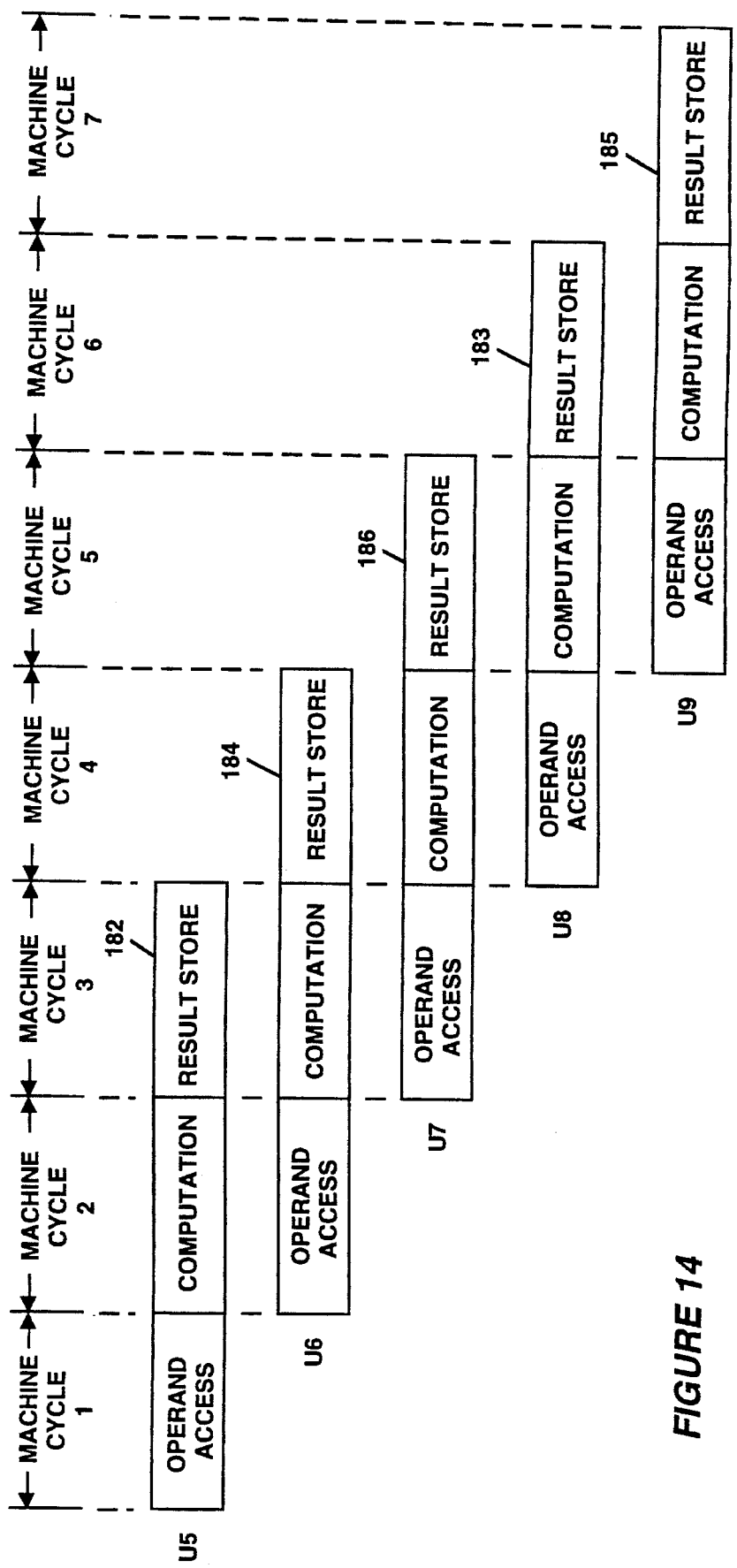

FIG. 14 demonstrates the use of the inhibit condition to delay the use of a dynamic microbranch by one cycle. At a point 182 in cycle 3, microinstruction u5 latches then drives conditions onto the microtest bus 39 which would normally be used three microinstructions later at a point 183, by microinstruction u8. The appropriate encoded value in u6, however, causes the microtest control logic 87 to prevent the conditions generated by microinstruction u6 from being forwarded, at a point 184, to the OR gate 86 via controller 87, as would normally be the case. Since the conditions are not updated at point 184, microinstruction u9 can use (at a point 185) the conditions generated by u5 one cycle after they would normally have been used (at a point 183). Assuming that microinstruction u7 did not contain the encoded value to inhibit condition updating, the conditions generated by microinstruction u5 will be updated at the point labeled 186, instead of at the point 184.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A processor comprising:

a) a control store for producing microinstructions in response to microaddresses applied to an input of the control store, the processor operating in machine cycles and the control store producing one of said microinstructions each machine cycle; each microinstruction executing during a plurality of successive machine cycles;

b) a plurality of execution stages, each execution stage using each one of said microinstructions in said successive machine cycles whereby execution of each of said microinstructions overlaps execution of other of said microinstructions, with latch means in each of said execution stages receiving said microinstructions to store and shift each microinstruction for said successive machine cycles;

c) means for generating condition information in response to a condition at an output of one of said execution stages in each of said successive machine cycles;

d) means for generating a next microaddress using said condition information, and for applying said next microaddress to said input of the control store;

e) and means for selecting said condition information generated in a selected machine cycle, for use by said means for generating a next micro-address after a designated number of said successive machine cycles, said designated number of said successive machine cycles being dependent upon a decoded field of one of said microinstructions.

2. A processor according to claim 1 wherein said processor includes an ALU in one of said execution stages and said condition is detected at the output of the ALU.

3. A processor according to claim 1 wherein said condition is detected at an output of a second of said plurality of execution stages.

4. A processor according to claim 3 wherein there are at least three of said execution stages.

5. A processor according to claim 1 wherein said microaddress for a given one of said microinstructions is produced during a first of said successive machine cycles, and said condition is detected during a later one of said successive machine cycles while said given one of the microinstructions is stored in said latch means.

6. A processor according to claim 5 wherein said later one of said machine cycles is more than two successive machine cycles later than said first of said successive machine cycles.

7. A processor according to claim 5 wherein said using of said condition is inhibited for at least one machine cycle by said means for selecting.

8. A processor comprising:

a) a code store for producing instruction code in response to addresses applied to an input of the code store, the processor operating in repetitive machine cycles and the code store producing one of said instruction codes each machine cycle; each one of said instruction codes executing during a plurality of successive machine cycles;

b) a plurality of execution stages, each one of said execution stages using each said instruction code in said successive machine cycles whereby execution of each of said instruction codes overlaps execution of other of said instruction codes, with latch means in each of said execution stages receiving said instruction codes to store each instruction code for at least one of said plurality of successive machine cycles;

c) means for generating condition information in response to a condition at an output of one of said execution stages;

d) means for generating a next address in using said condition information and applying said next address to said input of the code store;

e) and means for inhibiting said using of said condition information in response to a decoded field of said instruction code.

9. A processor according to claim 8 wherein said processor includes an arithmetic & logic unit in one of said execution stages and said condition is detected at the output of said arithmetic & logic unit.

10. A processor according to claim 8 wherein said condition is detected at an output of an execution stage after the first of said execution stages.

11. A processor according to claim 10 wherein there are at least three of said execution stages, and said condition is detected at the output of the second of such execution stages.

12. A processor according to claim 8 wherein said address for a given one of said instruction codes is produced during a first of said successive machine cycles, and said condition is detected during a later one of said successive machine cycles while said given one of the instruction codes is stored in said latch means.

13. A processor according to claim 12 wherein said later one of said machine cycles is more than two successive machine cycles later than said first of said successive machine cycles.

14. A processor according to claim 12 wherein said using of said condition is inhibited for at least one machine cycle.

15. A processor according to claim 8 wherein said instruction codes are microinstructions, and said code store is a microinstruction store.

16. A method of operating a digital processor comprising the steps of:

a) producing instruction code from a code store in response to addresses applied to an input of the code store, the processor operating in repetitive machine cycles and producing one of said instruction codes from the code store in each machine cycle, each one of said instruction codes executing during a plurality of successive machine cycles;

b) executing each said instruction code in a plurality of execution stages in said processor in successive machine cycles whereby execution of instruction codes is overlapped, and storing each instruction code for at least one of said plurality of successive machine cycles;

c) detecting a condition at an output of one of said execution stages to produce condition information in each of said successive machine cycle;

d) generating a next address using said condition information and applying said next address to said input of the code store;

e) and inhibiting said using of said condition information in response to the content of a part of said instruction code.

17. A method according to claim 16 wherein said processor includes an arithmetic & logic unit and said condition is detected at an output of said arithmetic & logic unit.

18. A method according to claim 16 wherein said condition is detected at an output of an execution stage after the first of said execution stages.

19. A method according to claim 18 wherein there are at least three of said execution stages, and said condition is detected at the output of the second of such execution stages.

20. A method according to claim 16 wherein said address for a given one of said instruction codes is produced during a first of said successive machine cycles, and said condition is detected during a later one of said successive machine cycles while said given one of the instruction codes is stored.

21. A method according to claim 20 wherein said later one of said machine cycles is more than two successive machine cycles later than said first successive machine cycle.

22. A method according to claim 20 wherein said using of said condition is inhibited for at least one machine cycle.

23. A method according to claim 16 wherein said instruction codes are microinstructions, and said code store is a microinstruction store.

24. A method of addressing a memory to produce control codes for controlling a plurality of successive stages operating in response to said control codes, wherein said memory produces a set of control codes during each of successive cycle times, and each said set of control codes is latched for use in said successive stages in successive ones of said cycle times, wherein said memory is a control store and said control codes are microinstructions, comprising the steps of:

a) generating a next address for said memory in response to a condition produced from one of said stages;

b) and, in response to a part of one of said control codes representing a conditional branching condition, generating a control signal for inhibiting said step of generating a next address in response to a condition produced from one of said stages, said step of inhibiting being in addition to an inhibit resulting from time delay in said step of generating a next address.

* * * * *